(12) United States Patent
Bakhsh et al.

(10) Patent No.: US 7,185,913 B2
(45) Date of Patent: Mar. 6, 2007

(54) INFLATABLE WINDSHIELD CURTAIN

(75) Inventors: Ali Emam Bakhsh, Rochester Hills, MI (US); Ayad Nayef, Sterling Heights, MI (US); Chang H. Lee, West Bloomfield, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 160 days.

(21) Appl. No.: 10/601,808

(22) Filed: Jun. 23, 2003

(65) Prior Publication Data

US 2004/0256841 A1 Dec. 23, 2004

Related U.S. Application Data

(63) Continuation-in-part of application No. 10/301,966, filed on Nov. 22, 2002, now Pat. No. 7,000,944.

(51) Int. Cl.
*B06R 21/231* (2006.01)
(52) U.S. Cl. .................. 280/730.1; 280/743.1
(58) Field of Classification Search ............. 280/730.1, 280/743.1, 729, 743.2, 732
See application file for complete search history.

(56) References Cited

U.S. PATENT DOCUMENTS

| | | | | |
|---|---|---|---|---|
| 4,169,613 A | * | 10/1979 | Barnett | ............ 280/743.1 |
| 5,048,863 A | * | 9/1991 | Henseler et al. | ......... 280/743.1 |
| 5,310,216 A | * | 5/1994 | Wehner et al. | ............ 280/743.1 |
| 5,482,318 A | * | 1/1996 | Sollars, Jr. | ............. 280/743.1 |
| 5,562,302 A | | 10/1996 | Turnbull | |
| 5,602,734 A | | 2/1997 | Kithil | |
| 6,179,326 B1 | | 1/2001 | Breed et al. | |
| 6,224,088 B1 | | 5/2001 | Lohavanijaya | |
| 6,431,586 B1 | | 8/2002 | Eyrainer et al. | |
| 6,460,878 B2 | | 10/2002 | Eckert et al. | |
| 2003/0052476 A1 | | 3/2003 | Rose | |
| 2004/0100074 A1 | * | 5/2004 | Bakhsh et al. | ............ 280/730.1 |

FOREIGN PATENT DOCUMENTS

DE 4343738 A1 * 6/1995

* cited by examiner

*Primary Examiner*—David R. Dunn
(74) *Attorney, Agent, or Firm*—Tarolli, Sundheim, Covell & Tummino LLP (57) ABSTRACT

Apparatus (10) for helping to protect an occupant of a vehicle (12) includes an inflatable windshield curtain (14). The windshield curtain (14) is inflatable away from a roof (40) of the vehicle to a position between a windshield (50) of the vehicle and a vehicle occupant. The windshield curtain (14) includes an inflatable upper portion (190) and an inflatable lower portion (192). The upper portion (190) is inflatable between the roof (40) and an instrument panel (64) of the vehicle (12) and between the windshield (50) and a vehicle occupant. The lower portion (192) is bifurcated and includes a first chamber (194) inflatable against a surface (222) of the instrument panel (64) presented generally toward the vehicle occupant. The lower portion (192) also includes a second chamber (196) inflatable against the windshield (50) and a surface (220) of the instrument panel (64) adjacent the windshield.

26 Claims, 8 Drawing Sheets

INFLATABLE WINDSHIELD CURTAIN

RELATED APPLICATION

This application is a continuation-in-part of U.S. patent application Ser. No. 10/301,966, filed Nov. 22, 2002 now U.S. Pat. No. 7,000,944.

FIELD OF THE INVENTION

The present invention relates to an apparatus including an inflatable vehicle occupant protection device for helping to protect a vehicle occupant upon the occurrence of an event such as a vehicle collision and/or a vehicle rollover.

BACKGROUND OF THE INVENTION

It is known to inflate an inflatable vehicle occupant protection device to help protect a vehicle occupant upon the occurrence of an event such as a vehicle collision or rollover. One particular type of inflatable vehicle occupant protection device is an inflatable driver or passenger air bag that is inflatable between the occupant and an instrument panel and/or steering wheel of the vehicle. Another type of inflatable vehicle occupant protection device is an inflatable side curtain that inflates away from the vehicle roof to a position between the vehicle occupant and a side structure of the vehicle. Other known types of inflatable vehicle occupant protection devices include seat-mounted side impact air bags, inflatable knee bolsters, and inflatable seat belts. The known inflatable vehicle occupant protection devices are inflated from a deflated condition by inflation fluid provided by an inflator.

SUMMARY OF THE INVENTION

The present invention relates to an apparatus for helping to protect an occupant of a vehicle. The apparatus includes an inflatable windshield curtain inflatable away from a roof of the vehicle to a position between a windshield of the vehicle and a vehicle occupant. The windshield curtain includes an inflatable upper portion and an inflatable lower portion. The upper portion is inflatable between the roof and an instrument panel of the vehicle and between the windshield and a vehicle occupant. The lower portion is bifurcated and includes a first chamber inflatable against a surface of the instrument panel presented generally toward the vehicle occupant. The lower portion also includes a second chamber inflatable against the windshield and a surface of the instrument panel adjacent the windshield.

The present invention also relates to an inflatable vehicle occupant protection device including a first and second panels of material, each of which includes an upper portion and a lower portion. The lower portions of the first and second panels are folded over onto themselves. Overlying folded over portions of the lower portion of the first panel are interconnected along first and second side edges of the first panel. Overlying folded over portions of the lower portion of the second panel are interconnected along first and second side edges of the second panel. The first and second panels are positioned overlying each other. Overlying upper portions of the first and second panels are interconnected along their respective first and second side edges.

The present invention also relates to an inflatable windshield curtain. The windshield curtain includes a first panel of material that has first and second side edges and a portion folded over onto itself. A second panel of material includes first and second side edges and has a portion folded over onto itself. First connections interconnect overlying folded over portions of the first panel along the first and second side edges of the first panel. Second connections interconnect overlying folded over portions of the second panel along the first and second side edges of the second panel. Third connections interconnect overlying portions of the first and second panels, separate from the folded over portions of the first and second panels. The third connections extend along the first and second side edges of the separate portions. The first, second, and third connections along the first side edges of the first and second panels converge at a first location on the windshield curtain. The first, second, and third connections along the second side edges of the first and second panels converge at a second location on the windshield curtain.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DESCRIPTION OF EMBODIMENTS

In this description of embodiments of the present invention, when reference is made to a longitudinal direction in or along the vehicle 12, it is meant to describe the direction generally along a central axis 250 (see FIG. 4) of the vehicle. This longitudinal direction may also be described as the direction generally along the length of the vehicle, in the direction of straight forward vehicle travel, or horizontally as viewed in FIGS. 1 and 2.

Figure 3:
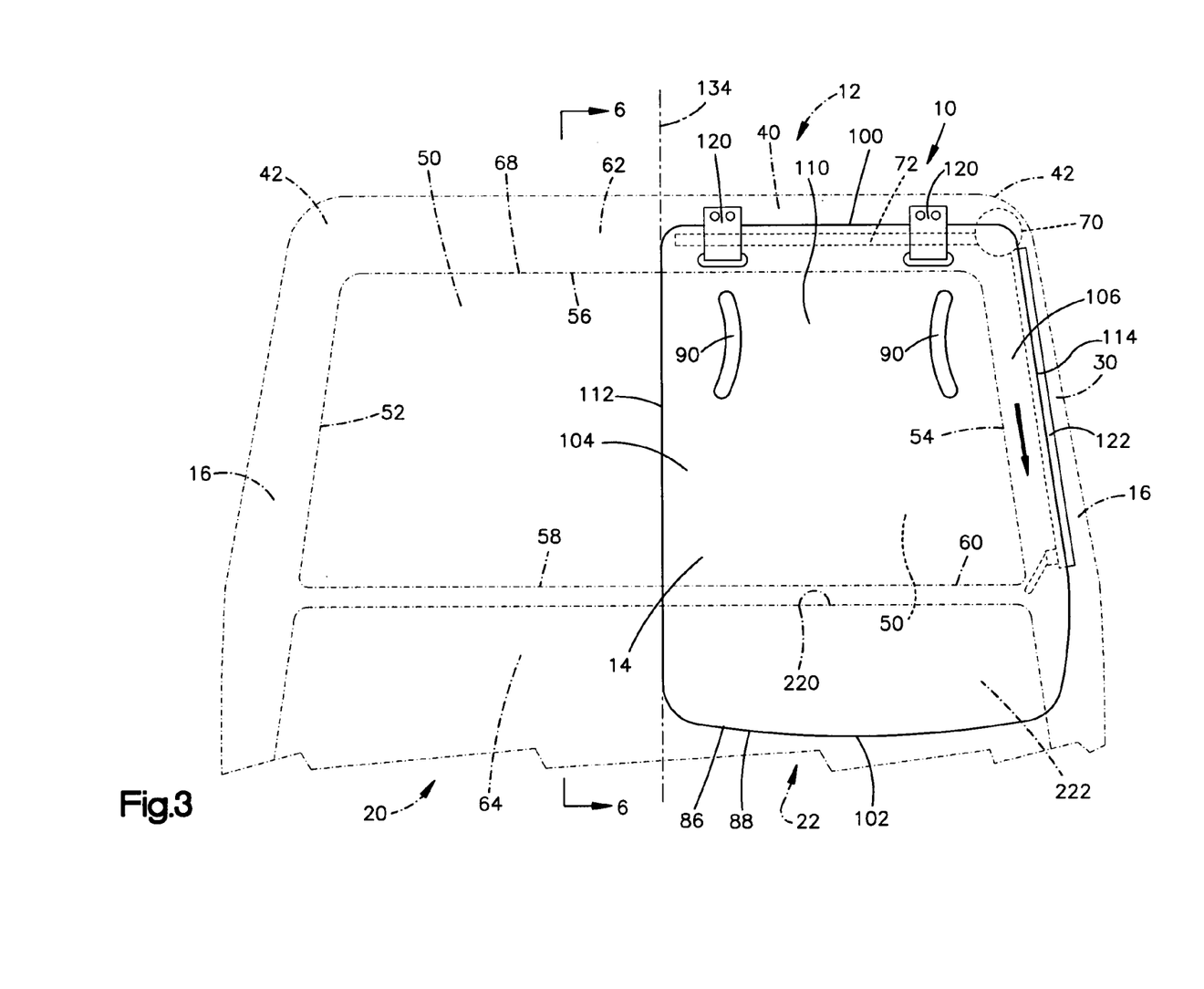
FIG. 3 is a schematic front view of a portion of the apparatus of FIG. 2.
Figure 4:
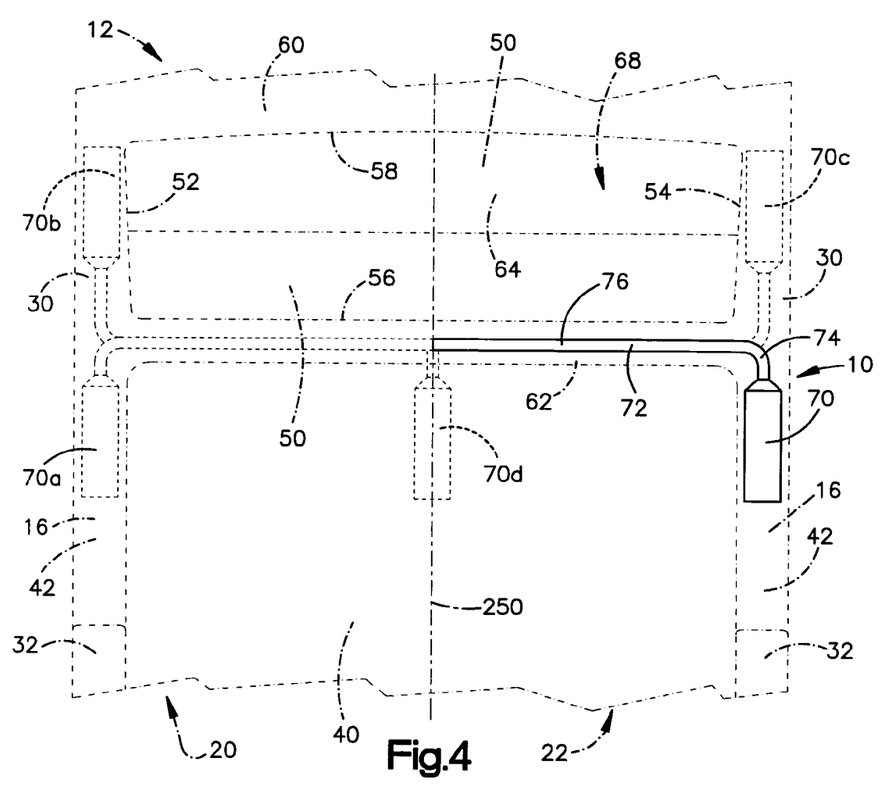
FIG. 4 is a schematic top view of the apparatus of FIGS. 1–3 with certain parts omitted for clarity.

Also, in this description of the present invention, when reference is made to a lateral direction in or across the vehicle 12, it is meant to describe the direction measured generally perpendicular to the central axis 250 (FIG. 4). This lateral direction may also be described as the direction measured generally along the width of the vehicle, perpendicular to the direction of straight forward vehicle travel, or horizontally as viewed in FIGS. 3 and 4.

Figure 1:
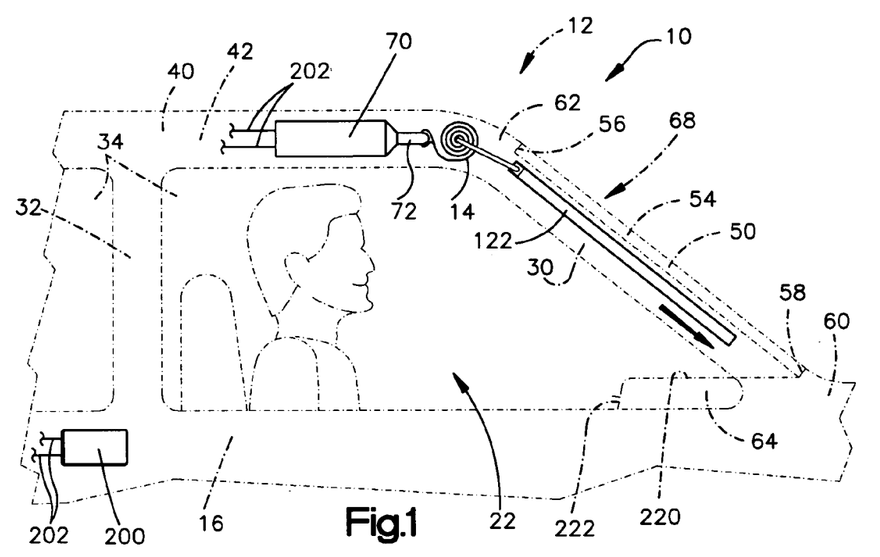
FIG. 1 is a schematic side view of an apparatus for helping to protect a vehicle occupant illustrating the apparatus in a deflated and stored condition, according to a first embodiment of the present invention.
Figure 2:
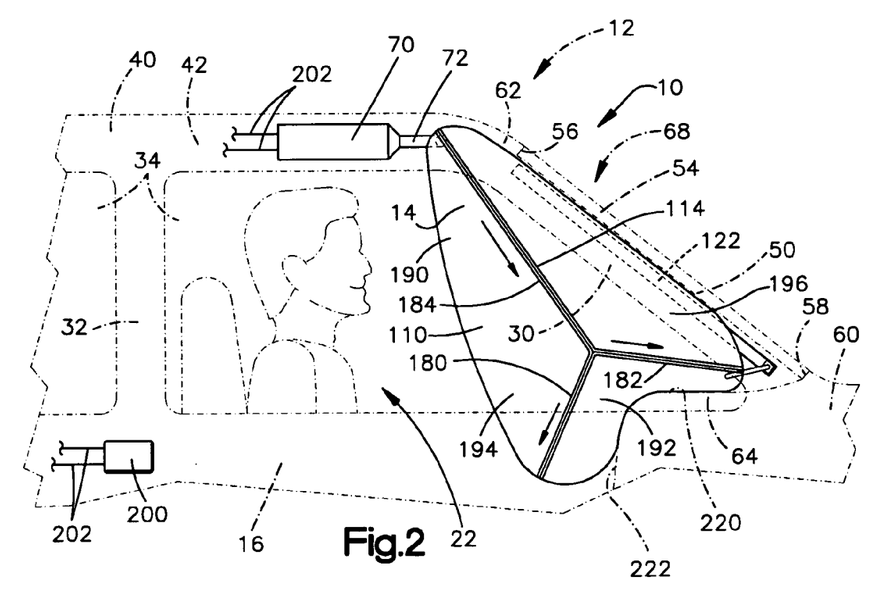
FIG. 2 is a schematic side view of the apparatus of FIG. 1 in an inflated and deployed condition.

Referring to FIGS. 1 and 2, as representative of a first embodiment of the present invention, an apparatus 10 helps to protect an occupant of a vehicle 12. The vehicle 12 includes side structure 16 that extends longitudinally along the length of the vehicle. Referring to FIGS. 3 and 4, it will be appreciated that the vehicle 12 includes a side structure 16 that extends along a driver side 20 of the vehicle and a side structure that extends along a passenger side 22 of the vehicle 12. The side structures 16 on the driver side 20 and passenger side 22 each include an A pillar 30 (see FIGS. 1 and 2), a B pillar 32, and side windows 34.

Referring to FIGS. 1–4, the vehicle 12 also includes a roof 40 that extends laterally across the vehicle 12 from the side structure 16 on the driver side 20 to the side structure on the passenger side 22 of the vehicle. The roof 40 also extends longitudinally along the length of the vehicle 12 from the A pillar 30 past the B pillar 32. The roof 40 includes roof rails 42 that extend along the intersection of the side structure 16 and the roof on the driver side 20 and passenger side 22 of the vehicle 12.

The vehicle 12 also includes a windshield 50. The windshield 50 extends laterally across the vehicle 12 from the A pillar 30 on the driver side 20 to the A pillar on the passenger side 22. The windshield 50 covers a windshield opening 68 of the vehicle 12. The windshield opening 68 is defined at an upper extent by a forward edge 62 of the vehicle roof 40 and at a lower extent generally by an instrument panel 64 and/or a hood 60 of the vehicle 12. The windshield opening 68 is defined at lateral extents by the A pillars 30 on the driver side 20 and passenger side 22 of the vehicle 12.

The windshield 50 has a first edge portion 52 that extends along the A pillar 30 on the driver side 20 from a position adjacent or near the intersection of the A pillar and the vehicle roof 40 to a position adjacent or near the intersection of the A pillar and the instrument panel 64 and/or hood 60 of the vehicle 12. The windshield 50 also has a second edge portion 54 opposite the first edge portion 52. The second edge portion 54 extends along the A pillar 30 on the passenger side 22 from a position adjacent or near the intersection of the A pillar and the vehicle roof 40 to a position adjacent or near the intersection of the A pillar and the instrument panel 64 and/or hood 60 of the vehicle 12.

The windshield 50 extends from the roof 40 to a position adjacent or near the instrument panel 64 and/or hood 60 of the vehicle 12. The windshield 50 has an upper edge 56 and an opposite lower edge 58 that extend laterally in the vehicle 12 between the first and second edge portions 52 and 54. The upper edge 56 extends laterally across the vehicle 12 along the forward edge 62 of the vehicle roof 40 from the A pillar on the driver side 20 to the A pillar on the passenger side 22. The lower edge 58 extends laterally across the vehicle 12 from the A pillar on the driver side 20 to the A pillar on the passenger side 22. The lower edge 58 extends adjacent or near the instrument panel 64 and/or hood 60 of the vehicle 12.

The apparatus 10 includes an inflatable vehicle occupant protection device in the form of an inflatable windshield curtain 14 that is mounted in the vehicle 12 adjacent the forward edge 62 of the vehicle roof 40. An inflator 70 is connected in fluid communication with the windshield curtain 14 through a fill tube 72. The inflator 70 is actuatable to provide inflation fluid for inflating the windshield curtain 14.

The fill tube 72 has a first portion 74 (FIG. 4) for receiving fluid from the inflator 70. The fill tube 72 has a second portion 76 disposed in the windshield curtain 14. The second portion 76 of the fill tube 72 has a plurality of openings (not shown) that provide fluid communication between the fill tube 72 and the windshield curtain 14. Those skilled in the art will appreciate that the fill tube 72 could, however, be omitted, in which case the inflator 70 may be connected in fluid communication with the windshield curtain 14 directly or via a manifold (not shown).

The inflator 70 contains a stored quantity of pressurized inflation fluid (not shown) in the form of a gas for inflating the windshield curtain 14. The inflator 70 alternatively could contain a combination of pressurized inflation fluid and ignitable material for heating the inflation fluid, or could be a pyrotechnic inflator that uses the combustion of gas-generating material to generate inflation fluid. As a further alternative, the inflator 70 could be of any suitable type or construction for supplying a medium for inflating the windshield curtain 14.

As shown in FIG. 4, the inflator 70 is positioned adjacent the roof rail 42 on the passenger side 22 of the vehicle 12. The fill tube 72 thus extends from the inflator 70 along a portion of the roof rail 42 and into the windshield curtain 14 along the intersection of the forward edge 62 of the vehicle roof and the upper edge 56 of the windshield 50. It will be appreciated, however, that the inflator 70 may have alternative positions in the vehicle 12.

By way of example, referring to FIG. 4, the inflator 70 may be positioned adjacent the roof rail 42 on the driver side 20 of the vehicle 12. This is illustrated at 70a. As another example, the inflator could be positioned in or on the A pillar 30 on the driver side 20 or passenger side 22 of the vehicle 12, as indicated at 70b and 70c, respectively, in FIG. 4. As a further example, the inflator could be positioned centrally on the roof 40, as indicated at 70d, in which case the inflator may have a T-shaped or L-shaped connection with the fill tube 72. This central location may also be advantageous in a configuration of the apparatus in which the fill tube 72 is omitted and the inflator 70 is connected to the windshield curtain 14 directly or via a manifold. Yet another example (not shown) is to position the inflator 70 within the instrument panel 64 of the vehicle 12.

Figure 5:
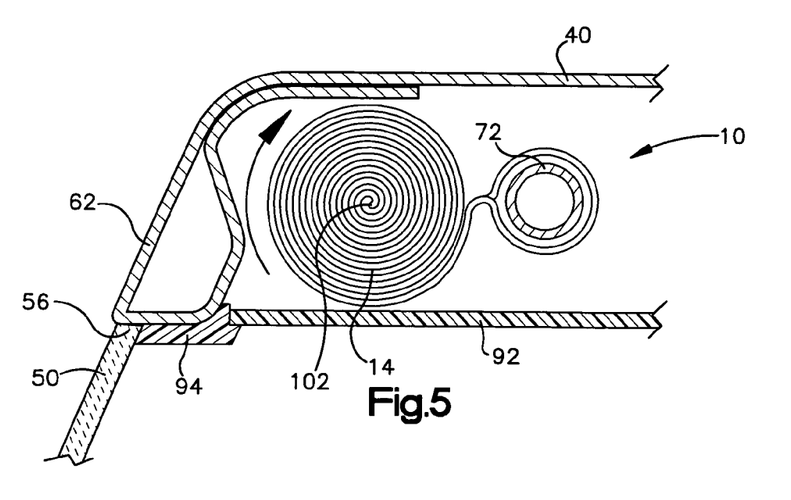
FIG. 5 is a sectional view of the apparatus in the deflated and stored condition of FIG. 1.

The apparatus 10 has a stored condition in which the windshield curtain 14 is stored in a deflated condition. This is illustrated in FIGS. 1 and 5. When the apparatus 10 is in the stored condition, the deflated windshield curtain 14 has an elongated configuration and extends along the forward edge 62 of the vehicle roof 40 adjacent or near the upper edge 56 of the windshield 50. In the first embodiment, the windshield curtain 14 when in the stored condition extends from the A pillar 30 on the passenger side 22 of the vehicle 12 to about the centerline 250 (FIG. 4) of the vehicle.

Referring to FIG. 5, the windshield curtain 14 is placed in the deflated and stored condition by rolling the curtain in a direction indicated by the curved arrow in FIG. 5. This is referred to herein as an "outboard roll" of the windshield curtain 14. According to this outboard roll, the windshield curtain 14 is placed in the stored condition by initially rolling the curtain in a direction outboard of the vehicle 12 toward the windshield 50 and continuing to roll the curtain in this direction. Placement of the windshield curtain 14 in the stored condition using the outboard roll is described in further detail below. Alternative methods may be used to place the windshield curtain 14 in the stored position. For example, the windshield curtain 14 may be folded in a back-and-forth manner sometimes referred to as a "fan fold" or "Z fold." As another example, the windshield curtain 14 may be folded over and then rolled into the stored position.

When the windshield curtain 14 is in the deflated and stored condition, the curtain is positioned between the vehicle roof 40 and a headliner 92 of the vehicle 12. The headliner 92 may be partially supported or covered by a vehicle trim piece 94. The trim piece 94 may, for example, extend along the intersection of the vehicle roof 40 and the windshield 50. The apparatus 10 may also include a housing (not shown) that houses the windshield curtain 14 in the stored condition between the roof 40 and the headliner 92.

Figure 6:
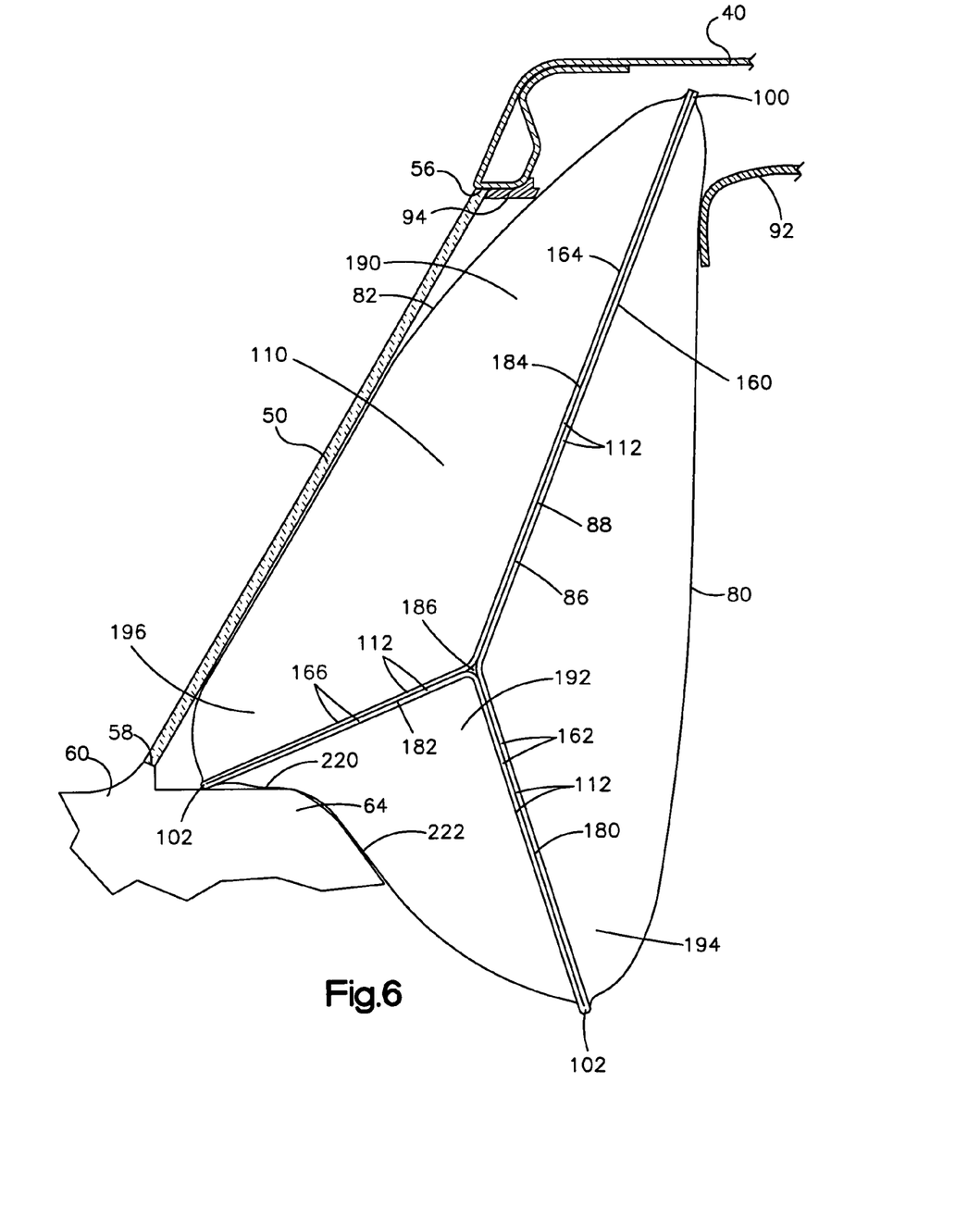
FIG. 6 is a sectional view taken generally along line 6—6 in FIG. 3.

Referring to FIG. 6, the windshield curtain 14 comprises first and second panels 80 and 82. The first and second panels 80 and 82 are interconnected to form a perimeter connection 86 that extends along a perimeter 88 of the panels. The first and second panels 80 and 82 may also be interconnected to form connections 90 (see FIG. 3) within the perimeter 88 of the windshield curtain 14. The perimeter connection 86 and the connections 90 within the perimeter 88 may help define inflatable chambers of the windshield curtain 14.

The first and second panels 80 and 82 (FIG. 6) may be interconnected in a variety of manners. For example, means such as stitching, dielectric sealing, ultrasonic bonding, heat sealing, and adhesives may be used to interconnect the first and second panels 80 and 82 in order to form the perimeter connection 86 and any other connections 90. In these constructions, the windshield curtain 14 may be formed by interconnecting two separate fabric pieces together along the perimeter connection 86 and any other connections. Alternatively, a single piece of fabric may be folded over to form the overlying first and second panels 80 and 82. In this alternative, the fold may form part of the perimeter connection 86 of the windshield curtain 14. As another alternative, the windshield curtain 14 may have a woven construction in which the first and second panels 80 and 82 are woven simultaneously. In this construction, portions of the first and second panels may be interconnected by interweaving the panels.

The windshield curtain 14 may have a variety of material constructions. For example, the windshield curtain 14 may be constructed of a woven fabric, such as nylon, that is coated with a gas impermeable material, such as urethane or silicone. The windshield curtain 14 thus may have a substantially gas-tight construction. Other materials, such as elastomers, plastic films, or combinations thereof, may also be used to construct the windshield curtain 14, in which case the curtain may have a non-woven construction. The materials used to construct the windshield curtain 14 may also be single or multi-layered materials.

The first and second panels 80 and 82, the perimeter connection 86, and any other connections 90 may be laminated with a plastic film or coated using a slurry, and/or a spray coating, such as silicone, urethane, or other suitable material, in order to achieve a substantially gas-tight construction. This helps to prevent gas from permeating directly through the first and second panels 80 and 82, or through the perimeter connection 86 or connections 90.

The perimeter 88 (FIG. 3) of the windshield curtain 14 is defined by upper and lower edges 100 and 102, respectively, of the curtain and first and second end portions 104 and 106, respectively, of the curtain that are spaced apart horizontally along the upper and lower edges. The perimeter connection 86 and the connections 90 help define an inflatable volume 110 of the windshield curtain 14. The first end portion 104 includes a first edge 112 of the windshield curtain 14 that extends between the upper edge 100 and the lower edge 102 of the curtain. The second end portion 106 includes a second edge 114 of the windshield curtain 14 that extends between the upper edge 100 and the lower edge 102 of the curtain.

The inflatable volume 110 of the windshield curtain 14 may have a variety of configurations defined by the shape of the perimeter connection 86 and the arrangement of any connections 90 within the perimeter connection. One such configuration is illustrated in the embodiment of FIG. 3. Those skilled in the art, however, will appreciate that the configuration of the inflatable volume 110 could vary.

The windshield curtain 14 may be adapted to receive one or more fastening devices 120 (FIG. 3), such as clamps or brackets, for helping to connect the windshield curtain to the vehicle 12. In the illustrated embodiment, the apparatus 10 includes two fastening devices 120 for connecting the windshield curtain 14 and the fill tube 72 to the vehicle roof 40.

Referring to FIGS. 1–3, the apparatus 10 may also include a slider mechanism 122 for helping to guide and position the windshield curtain 14 in the vehicle 12 upon inflation and deployment of the curtain. The slider mechanism 122 is provided on the A pillar 30 on the passenger side 22 of the vehicle 12. In the embodiment of FIGS. 1–3, the second end portion 106 of the windshield curtain 14 is connected to the slider mechanism 122.

Those skilled in the art will appreciate that alternative means may be provided for helping to guide and position the windshield curtain 14 in the vehicle 12. For example, tethers (elastic or inelastic), piston/cylinder devices, devices actuatable to cause rotation of a member such as a spool to wind up a flexible member, or any other suitable device could help guide and position the windshield curtain 14 in the vehicle 12. Also, it will be appreciated that the slider mechanisms 122 could be eliminated and the windshield curtain 14 could be connected directly to the A pillar 30 by suitable means, such as fasteners.

Referring to FIG. 3, the windshield curtain 14 is a passenger side windshield curtain. The windshield curtain 14 extends across the windshield 50 on the passenger side 22 of the vehicle 12 from the passenger side A pillar 30 to about a vehicle centerline 134. The windshield curtain 14 could, however, have alternative extents or coverage. For example, the windshield curtain 14 may be positioned on the driver side 20 of the vehicle 12 or may extend from the driver side to the passenger side of the vehicle. These alternatives are described below in further detail.

Construction of the windshield curtain 14 is illustrated in FIGS. 7A–7E. In FIGS. 7A–7E, the first and second panels 80 and 82 are formed from a single piece of material 150 that is folded over to form the panels. In FIGS. 7A–7E, the piece of material 150 is viewed from the same end as shown in FIG. 2. FIGS. 7A–7E thus illustrate the second end portion 106 and, more particularly, the second edge 114 of the windshield curtain 14. In this construction, a fold 152 divides the piece of material 150 into the first and second panels 80 and 82. The fold 152 may form a portion of the perimeter connection 86 extending between the first and second end portions 104 and 106 of the windshield curtain 14. The windshield curtain 14 could, however, have any of the alternative constructions described above. Also, in FIGS. 7A–7E, the first and second panels 80 and 82 are illustrated as being interconnected by stitching. The panels 80 and 82 could, however, be interconnected in any of the alternative manners described above.

Figure 7A:
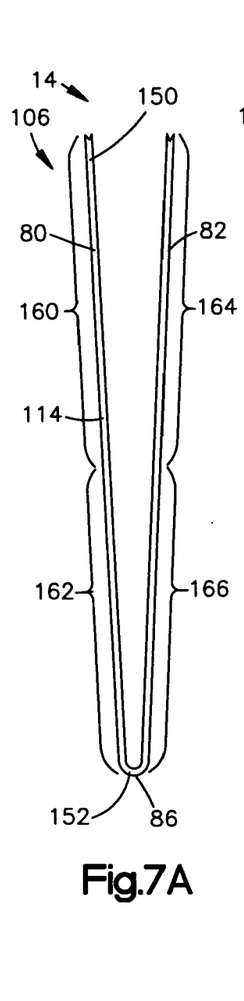
FIGS. 7A–7E are schematic views illustrating the construction of a portion of the apparatus of FIGS. 1–6.

Referring to FIG. 7A, the piece of material 150 is initially folded across its width to form the fold 152 and thereby define the first and second panels 80 and 82. As shown in FIG. 7A, the first panel 80 has an upper portion 160 and a lower portion 162. The second panel 82 has an upper portion 164 and a lower portion 166.

Figure 7B:
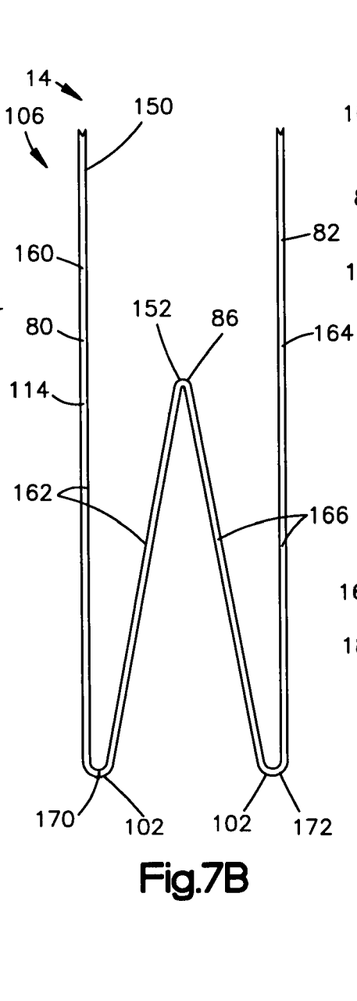

Next, as shown in FIG. 7B, the lower portions 162 and 166 of the first and second panels 80 and 82 are folded over along respective folds 170 and 172. The folds 170 and 172 extend across the width of the first and second panels 80 and 82. This divides the lower portions 162 and 166 into approximate halves.

Figure 7C:
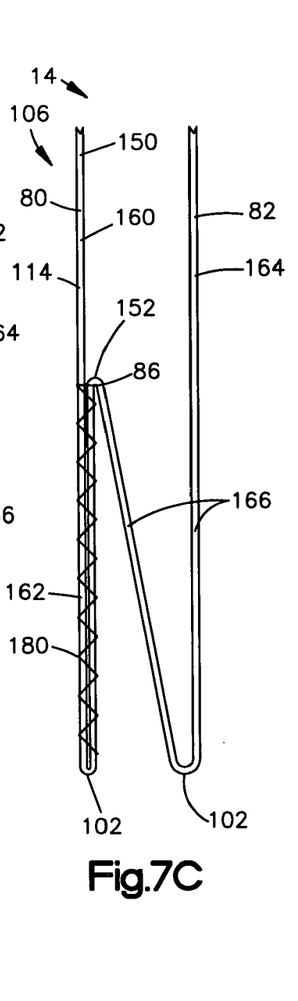

Next, as shown in FIG. 7C, the halves of the lower portion 162 of the first panel 80 are positioned in an overlying relationship. The halves of the lower portion 162 are then interconnected along the second edge 114 of the first panel 80 at a connection 180. In FIG. 7C, the connection 180 is formed by stitching together the halves of the lower portion 162. The connection 180 could, however, be formed via any of the alternative means described above (e.g., dielectric sealing, ultrasonic bonding, heat sealing, and adhesives).

Figure 7D:
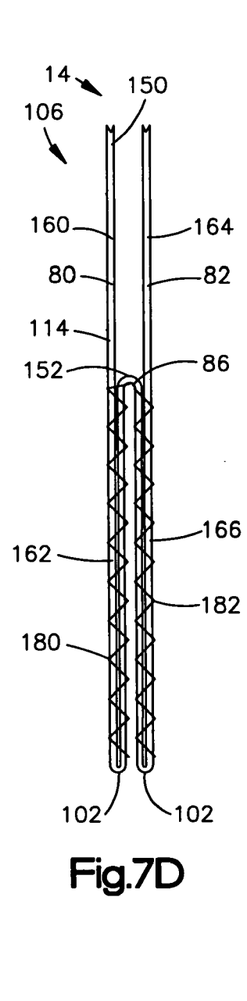

Next, as shown in FIG. 7D, the halves of the lower portion 166 of the second panel 82 are positioned in an overlying relationship. The halves of the lower portion 166 are then interconnected along the second edge 114 of the second panel 82 at a connection 182. In FIG. 7D, the connection 182 is formed by stitching together the halves of the lower portion 166. The connection 182 could, however, be formed via any of the alternative means described above.

Figure 7E:
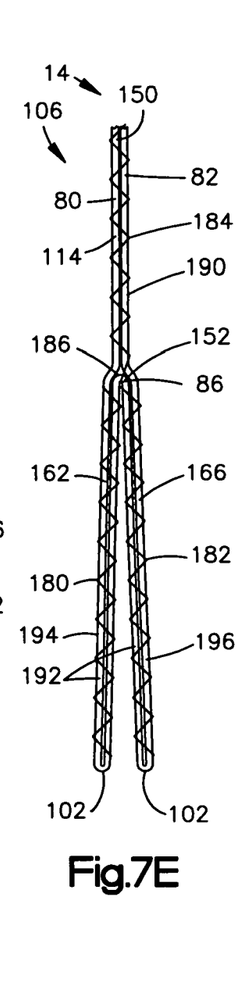

Next, as shown in FIG. 7E, the upper portions 160 and 164 of the first and second panels 80 and 82 are positioned in an overlying relationship. The upper portions 160 and 164 are then interconnected along the second edge 114 at a connection 184. In FIG. 7E, the connection 184 is formed by stitching together the upper portions 160 and 164. The connection 184 could, however, be formed via any of the alternative means described above.

The process illustrated in FIGS. 7A–7E is repeated at the first end portion 104 of the windshield curtain 14 to interconnect the first and second panels 80 and 82 along the first edge 112 of the curtain (see FIG. 6). Referring to FIG. 6, the upper portions 160 and 164 of the panels 80 and 82 and the respective halves of the lower portions 162 and 166 are interconnected along the first edge 112 of the curtain 14.

The first and second panels 80 and 82 are also interconnected along the upper edge 100 of the curtain in a manner similar or identical to the connections along the first and second edges 112 and 114. The first and second panels 80 and 82 are thus interconnected along the upper edge 100, lower edge 102, and first and second side edges 112 and 114 of the window curtain 14.

As shown in FIG. 7E, the connection 180 of the lower portion 162, the connection 182 of the lower portion 166, and the connection 184 of the upper portions 160 and 164 converge at a location identified generally at 186 in FIG. 7E. The connections 180, 182, and 184 may overlap each other at the location 186. The first and second panels 80 and 82 thus are interconnected in a continuous manner along the second edge 114 of the windshield curtain 14 from the upper edge 100 to the lower edge 102 of the curtain. Similarly, the first and second panels 80 and 82 are interconnected in a continuous manner along the first edge 112 of the windshield curtain 14 from the upper edge 100 to the lower edge 102 of the curtain.

The interconnected upper portions 160 and 164 of the first and second panels 80 and 82, lower portion 162 of the first panel 80, and lower portion 166 of the second panel 82 extend away from the location 186 and away from each other when the windshield curtain 14 is in the inflated condition. In this condition, the interconnected portions branch out from the common location 186 and form a generally Y-shaped configuration (inverted) as shown in FIGS. 2 and 6.

The interconnected segments of the first and second edges 112 and 114 of the first and second panels 80 and 82 formed by the connections 180, 182, and 184 help define inflatable portions of the windshield curtain 14. Referring to FIGS. 2, 6, and 7E, the connection 184 helps define an inflatable upper portion 190 of the windshield curtain 14. The connections 180 and 182 help define an inflatable lower portion 192 of the windshield curtain 14. The lower portion 192 has a bifurcated configuration and includes an inflatable first chamber 194 defined at least partially by the lower portion 162 of the first panel 80 and the connection 180. The lower portion 192 includes an inflatable second chamber 196 defined at least partially by the lower portion 166 of the second panel 82 and the connection 182.

The formation of the inflatable chambers 194 and 196 via the connections 180 and 182 along the first and second edges 112 and 114 of the folded over lower portions 162 and 166 provides an advantageous construction of the windshield curtain 14. This is because the inflatable chambers 194 and 196 are formed through folding the lower portions 162 and 166 of the panels 80 and 82 and interconnecting the panels to themselves and to each other along the perimeter 88 of the panels. No additional means, such as tethers (internal or external lengths of fabric, for example), are required to construct the inflatable chambers 194 and 196 of the windshield curtain 14.

Figure 8A:
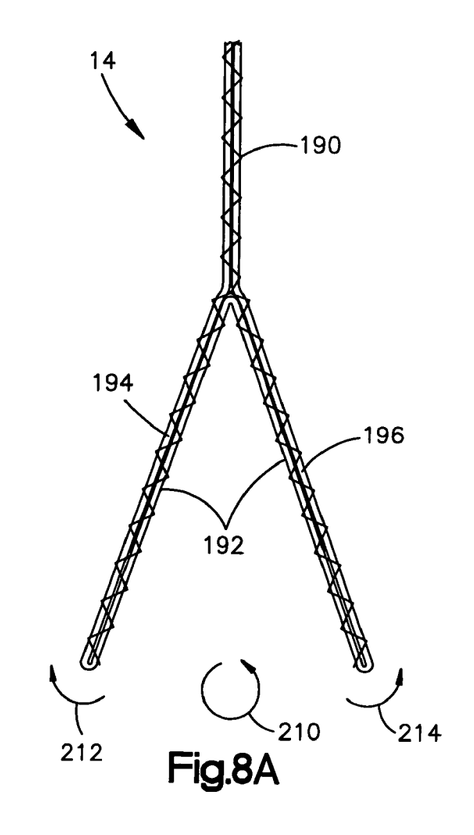
FIGS. 8A–8C are schematic views that illustrate placement of the apparatus in the stored condition of FIG. 1.
Figure 8B:
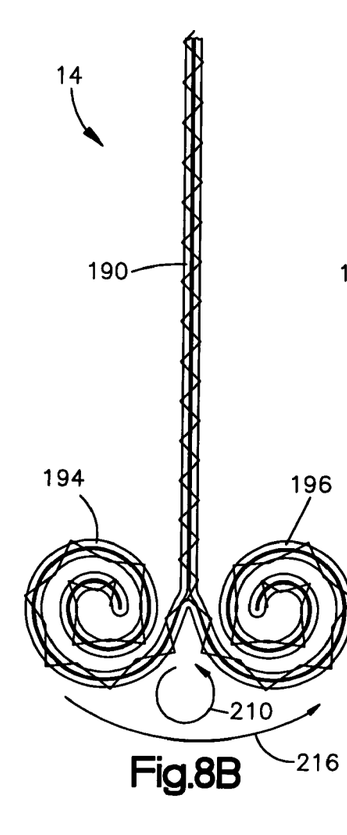
Figure 8C:
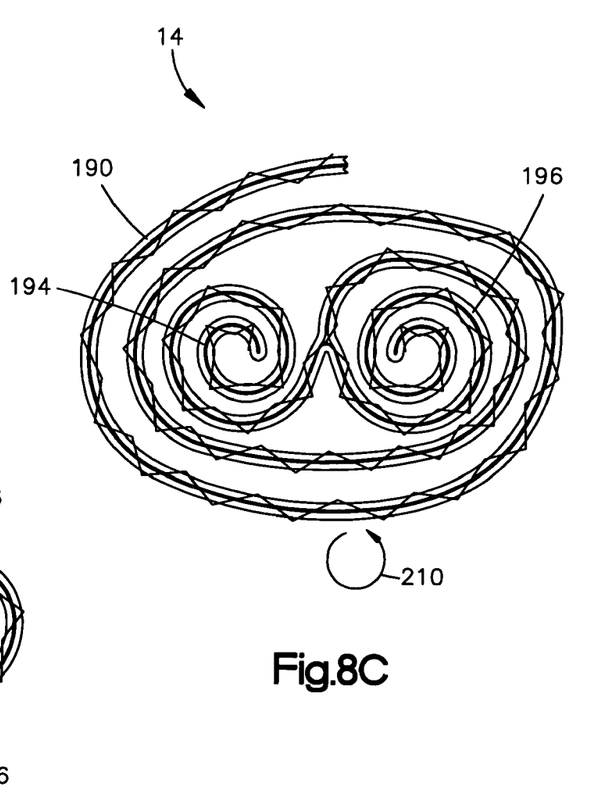

FIGS. 8A–8C illustrate one manner in which the windshield curtain 14 may be placed in the stored condition of FIGS. 1 and 5. In FIGS. 8A–8C, the outboard direction is indicated generally by the arrow labeled 210. Referring to FIG. 8A, the first chamber 194 of the windshield curtain 14 is rolled up in a direction opposite the outboard direction 210. This direction, referred to herein as an "inboard" direction, is indicated by the arrow labeled 212 in FIG. 8A. The second chamber 196 of the windshield curtain 14 is rolled up in the outboard direction 210. This direction is indicated by the arrow labeled 214 in FIG. 8A. The rolled-up first and second chambers 194 and 196 are shown in FIG. 8B.

Once the first and second chambers 194 and 196 are rolled up as shown in FIG. 8B, the lower portion 192 is rolled in the outboard direction into the upper portion 190. This is indicated by the arrow labeled 216 in FIG. 8B. The windshield curtain 14 is rolled in the outboard direction 216 until the upper portion 190 is rolled-up around the lower portion 192 and the curtain is placed in the condition illustrated in FIG. 8C. FIG. 8C illustrates a roll configuration into which the windshield curtain 14 may be placed when in the stored condition of FIGS. 1 and 5.

The vehicle 12 includes a sensor mechanism 200 (shown schematically in FIGS. 1 and 2) for sensing an event for which inflation of the windshield curtain 14 is desired, such as a vehicle collision and/or a vehicle rollover. Upon sensing the occurrence of the event for which inflation of the windshield curtain 14 is desired, the sensor mechanism 200 provides an electrical signal over lead wires 202 to the inflator 70. The electrical signal causes the inflator 70 to be actuated in a known manner. The inflator 70 discharges fluid under pressure into the fill tube 72. The fill tube 72 directs the fluid into the inflatable volume 110 of the windshield curtain 14.

The windshield curtain 14 inflates under the pressure of the inflation fluid from the inflator 70. The windshield curtain 14 inflates and deploys away from the roof 40 and along the windshield 50 to the position illustrated in FIGS. 2, 3 and 6. Referring to FIGS. 8A–8C, as the windshield curtain 14 inflates, the upper portion 190 unrolls in a direction opposite the direction indicated at 210. This may help direct the windshield curtain 14 to inflate along the windshield 50. Once the upper portion 190 is unrolled, the first chamber 194 of the curtain 14 unrolls in a direction opposite the direction indicated at 212 along the instrument panel 64 away from the windshield 50. The second chamber 196 unrolls in a direction opposite the direction indicated at 214 along the instrument panel 64 toward the windshield 50.

Referring to FIG. 3, the windshield curtain 14 when inflated, extends laterally across the vehicle from the A pillar 30 on the passenger side 22 to about the vehicle centerline 134. The second edge 114 may overlie the A pillar 30 on the passenger side 22 of the vehicle 12. The upper edge 100 is positioned adjacent the forward edge 62 of the roof 40 and the upper edge 56 of the windshield 50.

When the inflatable curtain 14 is in the inflated condition of FIGS. 2, 3, and 6, the upper portion 190 of the curtain extends from the vehicle roof 40 to a position above the instrument panel 64. The first chamber 194 of the windshield curtain 14 extends away from the upper portion 190 along the instrument panel 64 below an upper surface 220 of the instrument panel and against a surface 222 of the instrument panel presented toward or facing an occupant of the vehicle 12. The second chamber 196 of the windshield curtain 14 extends away from the upper portion 190 and the first chamber 194 against and along the upper surface 220 of the instrument panel 64 toward the windshield 50.

As illustrated in the first embodiment, the instrument panel 64 has a distinct upper surface 220 that extends generally horizontally in the vehicle 12 and a distinct front surface 222 that extends at an angle with the upper surface. Those skilled in the art, however, will appreciate that the instrument panel 64 may have a variety of alternative constructions in which the upper surface 220 and front surface 222 are not as distinct and/or do not extend in the same respective directions in the vehicle 12. The instrument panel 64 could, for example, have a curved or contoured configuration free from distinct upper and front surfaces.

It will thus be appreciated that the first and second chambers 194 and 196 of the windshield curtain 14, when inflated, are positioned against respective portions of the contour of the instrument panel 64. The first chamber 194 may thus be positioned against a surface 222 of the instrument panel 64 facing or presented generally toward an occupant of the passenger side 22 of the vehicle 12. The first chamber 194, when in this position, is positioned between the surface 222 of the instrument panel 64 and an occupant in the passenger side 22 of the vehicle 12. The second chamber 196 may thus be positioned along the contour of the instrument panel 64 adjacent or near the windshield 50.

The size and extent of the upper portion 190 and first and second chambers 194 and 196 may be adjusted by altering the lengths of the upper portions 160 and 164 and the lower portions 162 and 166 of the first and second panels 80 and 82. For example, the size and extent of the first chamber 194 (FIG. 7E) may be increased by folding the first panel 80 along the fold line 170 (FIG. 7B) at a location that is effective to lengthen the halves of the lower portion 162 of the first panel. In this instance, lengthening of the lower portion 162 may be achieved by taking up material from the upper portion 160 or by increasing the overall length of the first panel 80.

Similarly, the size and extent of the second chamber 196 (FIG. 7E) may be increased by folding the second panel 82 along the fold line 172 (FIG. 7B) at a location that is effective to lengthen the halves of the lower portion 166 of the second panel. In this instance, lengthening of the lower portion 166 may be achieved by taking up material from the upper portion 164 or by increasing the overall length of the second panel 82. Furthermore, the size and extent of the upper portion 190 (FIG. 7E) may be increased by increasing the lengths of the upper portions 160 and 164 of the first and second panels 80 and 82.

The windshield curtain 14, when inflated, is thus positioned between a vehicle occupant and the windshield 50 and windshield opening 68, as well as between the vehicle occupant and the instrument panel 64. The windshield curtain 14 provides an inflated area of protection that extends on the passenger side 22 of the vehicle 12 from the vehicle roof 40 down to adjacent the front surface 222 and below the upper surface 220 of the instrument panel 64.

The windshield curtain 14, when inflated, helps to protect a vehicle occupant upon the occurrence of an event (e.g., vehicle collision or rollover) for which inflation of the windshield curtain is desired. The upper portion 190 helps protect against impacts with the windshield 50. The first chamber 194 helps protect against impacts with the instrument panel 64. The second chamber 196, positioned adjacent the windshield 50 helps provide a reaction surface that helps support the windshield curtain 14. The connections 90 help to limit the thickness of the inflated windshield curtain 14 and help to reduce the overall volume of the curtain. The inflated chambers of the windshield curtain 14, while inflated, may help absorb the energy of impacts with the windshield curtain and may help distribute the impact energy over a large area of the curtain.

Figure 9:
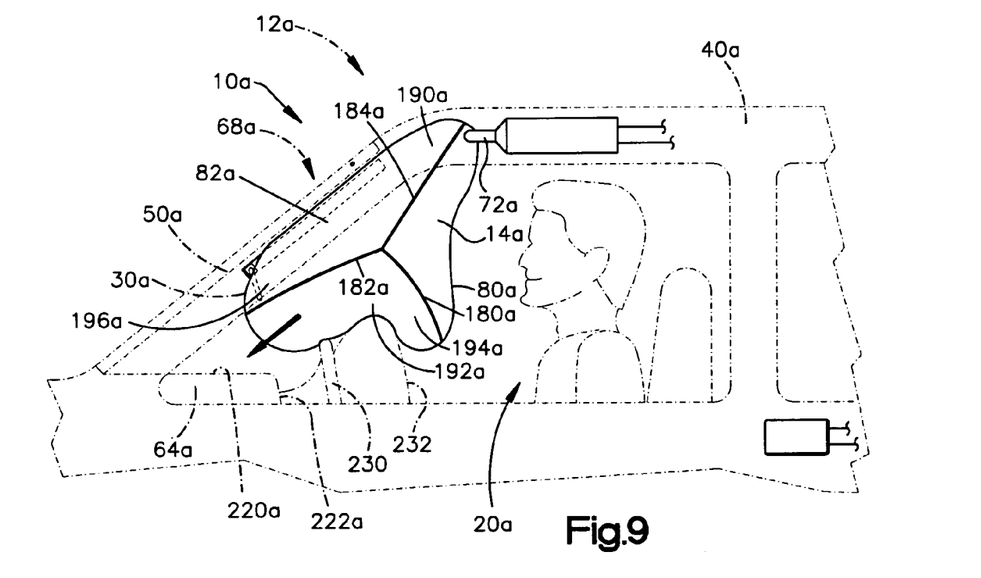
FIG. 9 is a schematic side view of an apparatus for helping to protect a vehicle occupant, according to a second embodiment of the present invention.

A second embodiment of the present invention is illustrated in FIG. 9. The second embodiment of the invention is similar to the first embodiment of the invention illustrated in FIGS. 1–8C. Accordingly, numerals similar to those of FIGS. 1–8C will be utilized in FIG. 9 to identify similar components, the suffix letter "a" being associated with the numerals of FIG. 9 to avoid confusion. The second embodiment of the present invention is similar to the first embodiment (FIGS. 1–8C), except that the windshield curtain of the second embodiment is a driver side windshield curtain.

Referring to FIG. 9, the apparatus 10a includes a windshield curtain 14a that is inflatable on the driver side 20a of the vehicle 12a. The construction of the windshield curtain 14a of the second embodiment may be similar or identical to the construction of the curtain of the first embodiment illustrated in FIGS. 1–8C. The windshield curtain 14a (FIG. 9) of the second embodiment may, however, be sized or scaled to accommodate the structural or architectural features of the driver side 20a of the vehicle 12a. More particularly, the windshield curtain 14a may be sized smaller than the curtain of the first embodiment to account for the fact that the driver side 20a includes a steering wheel 230 and may include a driver side air bag 232.

In the configuration illustrated in FIG. 9, the air bag 232, when inflated, is positioned between the steering wheel 230 and an occupant of the driver side 20a of the vehicle 12a. The air bag 232, when inflated, is also positioned between the instrument panel 64a and the occupant of the driver side 20a of the vehicle 12a. Because of this, it may not be necessary for the windshield curtain 14a of the second embodiment to extend from the roof 40*a* all the way down to the instrument panel 64*a* and against the surfaces 220*a* and 222*a* of the instrument panel as does the curtain of the first embodiment.

The windshield curtain 14*a* includes connections 180*a*, 182*a*, and 184*a* that interconnect the first and second panels 80*a* and 82*a*. The connections 180*a*, 182*a*, and 184*a* help define an inflatable upper portion 190*a*, and an inflatable lower portion 192*a* including an inflatable first chamber 194*a* and an inflatable second chamber 196*a*. The upper portion 190*a* is inflatable along the windshield 50*a* between the roof 40*a* and the steering wheel 230 and air bag 232. The first chamber 194*a* is inflatable away from the upper portion 190*a* and away from the windshield 50*a* between the steering wheel 230/air bag 232 and an occupant of the driver side 20*a*. The first chamber 194*a*, when inflated, is positioned against the air bag 232. The second chamber 196*a* is inflatable away from the upper portion 190*a* toward the windshield 50*a* between the windshield and the steering wheel 230/air bag 232. The second chamber 196*a*, when inflated, is positioned against the windshield 50*a* and against the rear of the air bag 232 and the top of the steering wheel 230.

The windshield curtain 14*a*, when inflated, is positioned between an occupant of the driver side 20*a* and the windshield 50*a*, windshield opening 68*a*, instrument panel 64*a*, and steering wheel 230. The windshield curtain 14*a* in combination with the air bag 232 provide an inflated area of protection on the driver side 20*a* of the vehicle 12*a* that extends from the vehicle roof 40*a* down to adjacent the steering wheel 230.

The windshield curtain 14*a*, when inflated, helps to protect a vehicle occupant upon the occurrence of an event for which inflation of the windshield curtain is desired, such as a vehicle collision or rollover. The upper portion 190*a* helps protect against impacts with the windshield 50*a*. The first chamber 194*a* helps protect against impacts with the steering wheel 230. The second chamber 196*a*, positioned against the windshield 50*a* and against the steering wheel 230 and air bag 232, helps provide a reaction surface that may help support the windshield curtain 14*a* and the air bag 232. The inflated chambers of the windshield curtain 14*a*, while inflated, may help absorb the energy of impacts with the windshield curtain and may help distribute the impact energy over a large area of the curtain. As another feature, the bifurcated configuration of the lower portion 192*a* may permit for deployment of the air bag 232 between the first and second chambers 194*a* and 196*a*.

Figure 10:
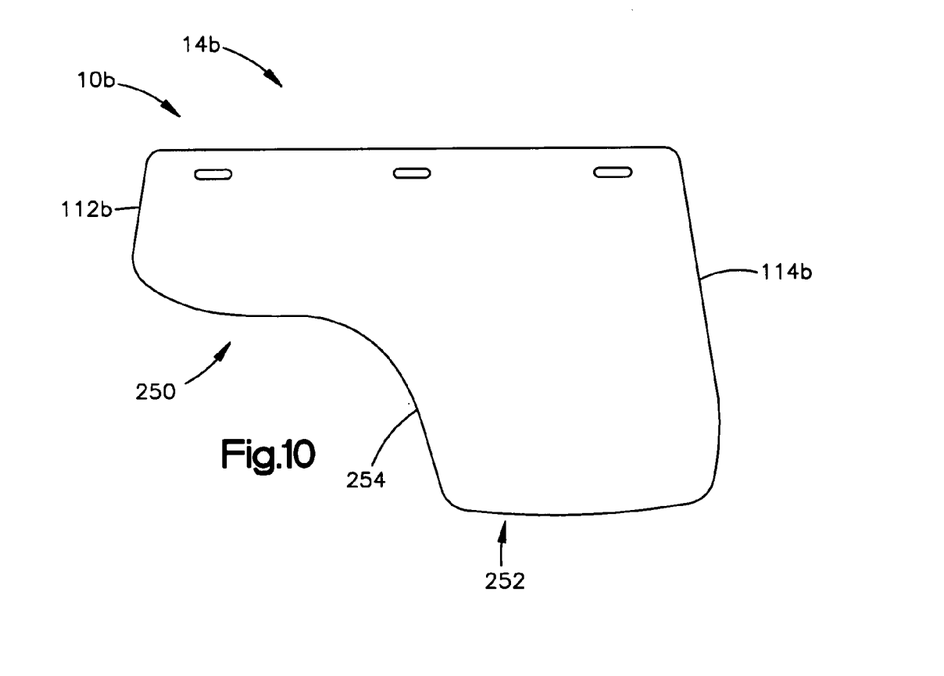
FIG. 10 is a schematic front view of an apparatus for helping to protect a vehicle occupant, according to a third embodiment of the present invention.

A third embodiment of the present invention is illustrated in FIG. 10. The third embodiment of the invention is similar to the first and second embodiments of the invention illustrated in FIGS. 1–9. Accordingly, numerals similar to those of FIGS. 1–9 will be utilized in FIG. 10 to identify similar components, the suffix letter "b" being associated with the numerals of FIG. 10 to avoid confusion.

According to the third embodiment of the present invention, the apparatus 10*b* includes windshield curtain 14*b*. The windshield curtain 14*b* is a single inflatable device for helping to protect occupants of both the driver side and passenger side of a vehicle (not shown). The windshield curtain 14*b* includes a driver side portion 250 and a passenger side portion 252.

The driver side portion 250 may have a construction similar to that described above in reference to the windshield curtain 14*a* (FIG. 9) of the second embodiment. The driver side portion 250 (FIG. 10) thus may include connections along a first edge 112*b* of the curtain 14*b* that help define an inflatable upper portion and an inflatable lower portion including inflatable first and second chambers that are similar or identical to those of the windshield curtain of the second embodiment (see FIG. 9). The driver side portion 250 may thus help protect an occupant of a driver side of the vehicle in a manner similar or identical to the windshield curtain of the second embodiment.

The passenger side portion 252 may have a construction similar to that described above in reference to the windshield curtain 14 (FIGS. 1–8C) of the first embodiment. The passenger side portion 252 (FIG. 10) thus may include connections along a second edge 114*b* of the curtain 14*b* that help define an inflatable upper portion and an inflatable lower portion including inflatable first and second chambers that are similar or identical to those of the windshield curtain of the first embodiment (see FIGS. 1–8C). The passenger side portion 252 may also include similar connections along a transitional edge 254 of the windshield curtain 14*b* that extends between the driver side portion 250 and passenger side portion 252. The passenger side portion 252 may thus help protect an occupant of a passenger side of the vehicle in a manner similar or identical to the windshield curtain of the first embodiment.

Those skilled in the art will appreciate that the driver side portion 250 and passenger side portion 252 each may have the configurations described above independently from each other. Thus, for example, the passenger side portion 252 may have the chambered configuration described above while the driver side portion 250 has a single chamber configuration. Similarly, the driver side portion 250 may have the chambered configuration described above while the passenger side portion 252 has a single chamber configuration.

Figure 11A:
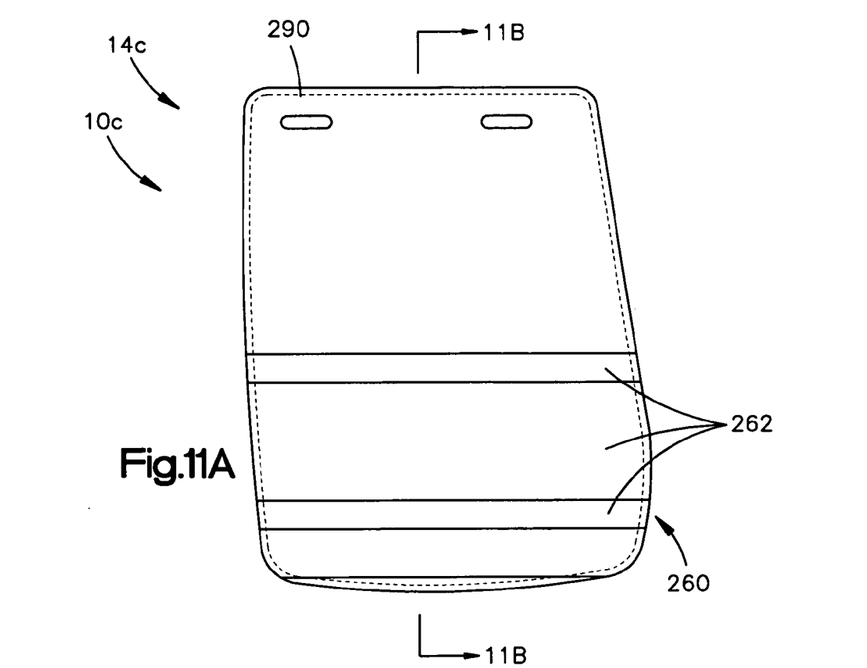
FIG. 11A is a schematic front view of an apparatus for helping to protect a vehicle occupant, according to a fourth embodiment of the present invention.
Figure 11B:
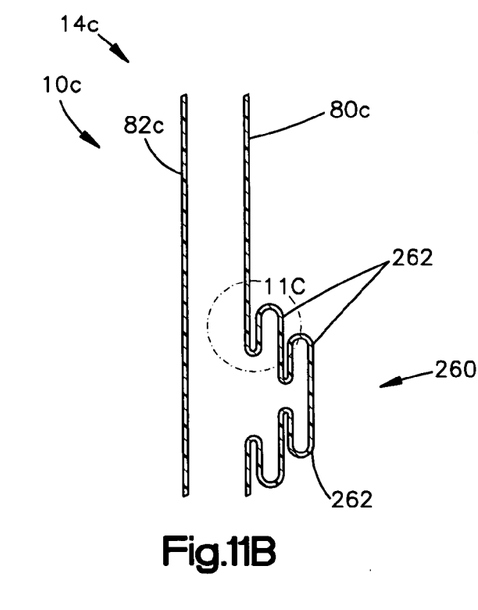
FIG. 11B is a sectional view taken generally along line 11B—11B in FIG. 11A.
Figure 11C:
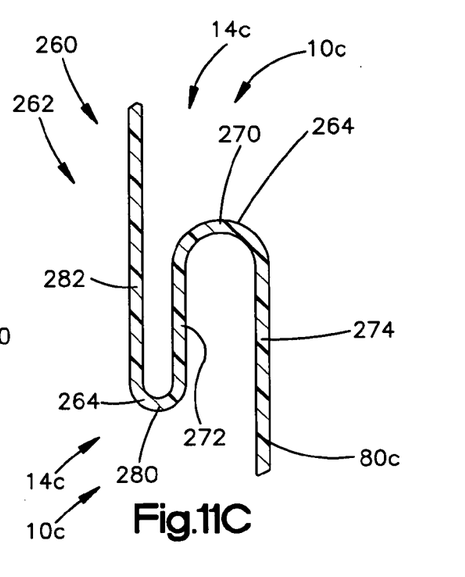
FIG. 11C is a magnified view of a portion of the apparatus indicated generally by line 11C in FIG. 11B.

A fourth embodiment of the present invention is illustrated in FIGS. 11A–11C. The fourth embodiment of the invention is similar to the embodiments of the invention illustrated in FIGS. 1–10. Accordingly, numerals similar to those of FIGS. 1–10 will be utilized in FIG. 11 to identify similar components, the suffix letter "c" being associated with the numerals of FIGS. 11A–11C to avoid confusion. The windshield curtain of the fourth embodiment is similar to the curtains of FIGS. 1–10, except that the curtain of FIG. 11A–11C includes a portion with a pleated construction.

Referring to FIG. 11A, the apparatus 10*c* includes a windshield curtain 14*c* with a pleated portion 260. The pleated portion 260 includes a plurality of pleats 262. The pleated portion is provided in an area or region of the windshield curtain 14*c* where it is desired to provide an increase in the inflated depth of the curtain. In FIGS. 11A–11C, the pleats 262 are illustrated as being incorporated into a passenger side windshield curtain 14*c*. It will be appreciated, however, that the pleats 262 may also be incorporated into the design of a driver side windshield curtain, passenger side windshield curtain, or a windshield curtain for both driver side and passenger side protection.

In this description, a "pleat" is meant to describe a portion of the windshield curtain 14 in which a curtain panel is folded over or doubled onto itself. Referring to FIG. 11B, the pleats 262 are folded in the first panel 80*c* of the windshield curtain 14*c*. The pleats 262 could, however, be folded into the second panel 82*c*, if desired. Referring to FIG. 11C, a pleat 262 is formed by folding the first panel 80*c* along fold lines 264. The pleat 262 includes three overlying portions of the first panel 80*c*. The panel 80*c* is folded along a first fold line 270 to form a first portion 272 that overlies a second portion 274. The panel 80*c* is also folded along a second fold line 280 to form a third portion 282 that overlies the first portion 272 opposite the second portion 274. Referring to FIG. 11A and 11C, stitching 290 connects the portions 272, 274, and 282 of the pleats 262 at opposite ends of the pleat. This stitching 290 may be the same stitching used to connect the first and second panels 80c and 82c to form the inflatable upper and lower portions of the curtain.

When the windshield curtain 14c inflates to the inflated condition, the pleats 262 unfold to allow for the expansion of the pleated portion 260 of the curtain. The stitching 290 maintains the interconnection of the overlying portions (see 272, 274, and 282 in FIG. 11C) of the panel 80c at opposite end portions of the pleats 262. The portions of the pleats 262 positioned between these opposite end portions unfold while the end portions remain in the connected and folded condition described above.

The degree to which the windshield curtain 14c expands in the area of the pleats 262 may be determined by adjusting the number of pleats, the width of the pleats, the length of the pleats, and the location at which the folded over portions of the pleats are interconnected. Adjusting the number and/or width of the pleats 262 helps determine the amount of the panel 80c (e.g., length) that is folded up into the pleats and thereby helps determine the inflated depth of the pleated portion. Adjusting the width of the pleats 262 and the locations at which the folded over portions of the pleats are interconnected helps define the bounds or extent of the pleated portion 260 of the curtain 14c.

The pleats 262, when unfolded, allow the pleated portion 260 of the windshield curtain 14c to inflate to an increased depth in comparison with other portions of the curtain. This increased depth may help enhance the protection afforded a vehicle occupant by the windshield curtain 14c by increasing the cushioning effect provided by the curtain.

From the above description of the invention, those skilled in the art will perceive improvements, changes and modifications. For example, the structural configuration of the vehicle (e.g., the roof, headliner, trim piece, A pillars, windshield, instrument panel, and hood) depicted in the illustrated embodiments is a simplified schematic example of a structural configuration in which the present invention may be implemented. This illustrated vehicle configuration is not meant to limit or otherwise preclude implementation of the present invention in a vehicle in which the structural configuration may differ from the structure depicted herein. These and other such improvements, changes and modifications within the skill of the art are intended to be covered by the appended claims.

The invention claimed is:

1. Apparatus for helping to protect an occupant of a vehicle that has a roof, a windshield, and an instrument panel, said apparatus comprising:
   an inflatable windshield curtain inflatable away from the roof to a position between the windshield and a vehicle occupant, said windshield curtain including an inflatable upper portion and an inflatable lower portion, said upper portion being inflatable between the roof and the instrument panel and between the windshield and the vehicle occupant, said lower portion being bifurcated to define first and second chamber portions, said first chamber portion when inflated being positioned against a surface of the instrument panel presented generally toward the vehicle occupant, said second chamber portion being inflatable against the windshield and a surface of the instrument panel adjacent the windshield.

2. The apparatus recited in claim 1, wherein said inflatable vehicle occupant protection device is free from tethers for helping to define said first and second chambers.

3. The apparatus recited in claim 1, wherein the surface of the instrument panel presented generally toward the vehicle occupant extends at an angle to the surface of the instrument panel adjacent the windshield.

4. The apparatus recited in claim 1, wherein said windshield curtain further comprises a pleated portion, said pleated portion being unfoldable to allow expansion of said pleated portion upon inflation of said windshield curtain.

5. The apparatus recited in claim 1, wherein said windshield curtain when inflated in the vehicle provides an inflated protection wall extending from the roof of the vehicle down to a position against the surface of the instrument panel of the vehicle presented generally toward the vehicle occupant and below the surface of the instrument panel adjacent the windshield.

6. The apparatus recited in claim 5, wherein said windshield curtain when inflated extends from a passenger side A pillar to about a longitudinal centerline of the vehicle.

7. The apparatus recited in claim 5, wherein said windshield curtain when inflated extends from a driver side A pillar to about a longitudinal centerline of the vehicle.

8. The apparatus recited in claim 5, wherein said windshield curtain when inflated extends from a driver side A pillar to a passenger side A pillar.

9. The apparatus recited in claim 8, wherein said first and second chambers are included in a passenger side portion only of the windshield curtain.

10. The apparatus recited in claim 1, further comprising an inflation fluid source actuatable to provide inflation fluid for inflating said windshield curtain.

11. An inflatable vehicle occupant protection device comprising:
    a first panel of material including an upper portion and a lower portion, said lower portion of said first panel being folded over onto itself, overlying folded over portions of said lower portion of said first panel being interconnected along first and second side edges of said first panel; and
    a second panel of material including an upper portion and a lower portion, said lower portion of said second panel being folded over onto itself, overlying folded over portions of said lower portion of said second panel being interconnected along first and second side edges of said second panel;
    said first and second panels being positioned overlying each other, overlying upper portions of said first and second panels being interconnected along their respective first and second side edges, said inflatable vehicle occupant protection device when inflated in a vehicle providing an inflated protection wall extending from adjacent a roof of the vehicle down to adjacent an instrument panel of the vehicle.

12. The inflatable vehicle occupant protection device recited in claim 11, wherein said first and second panels each include upper and lower edges extending between their respective first and second side edges, said upper edges of said first and second panels being interconnected with each other, said lower edges of said first and second panels being interconnected with each other.

13. The inflatable vehicle occupant protection device recited in claim 12, wherein said overlying first and second panels help define an inflatable volume of said inflatable vehicle occupant protection device, said inflatable volume comprising:
    an inflatable upper portion defined between said interconnected upper portions of said first and second panels;

an inflatable first chamber defined by said interconnected folded over portions of said lower portion of said first panel; and an inflatable second chamber defined by said interconnected folded over portions of said lower portion of said second panel.

14. The inflatable vehicle occupant protection device recited in claim 13, wherein said inflatable upper portion is inflatable between a roof of a vehicle and an instrument panel of the vehicle and also between a windshield of the vehicle and a vehicle occupant;

said first chamber being inflatable away from said inflatable upper portion and away from said second chamber against a surface of the instrument panel facing the vehicle occupant;

said second chamber being inflatable away from said inflatable upper portion toward the windshield against an upper surface of the instrument panel.

15. The inflatable vehicle occupant protection device recited in claim 13, wherein said inflatable vehicle occupant protection device is free from tethers for interconnecting said panels to help define said first and second chambers.

16. The inflatable vehicle occupant protection device recited in claim 11, wherein said lower portions of said overlying first and second panels are folded along fold lines extending across a width of said first and second panels.

17. The inflatable vehicle occupant protection device recited in claim 11, wherein said inflatable vehicle occupant protection device comprises a single piece of material folded over to define said first and second panels.

18. The inflatable vehicle occupant protection device recited in claim 11, wherein said inflatable vehicle occupant protection device further comprises a pleated portion, said pleated portion being unfoldable to allow expansion of said pleated portion upon inflation of said inflatable vehicle occupant protection device.

19. The inflatable vehicle occupant protection device recited in claim 18, wherein said pleated portion comprises portions of at least one of said first and second panels folded over to form at least one pleat, said inflatable vehicle occupant protection device including connections that interconnect overlying folded portions of said at least one pleat.

20. The inflatable vehicle occupant protection device recited in claim 11, wherein said inflated protection wall extends below an upper surface of the instrument panel.

21. The inflatable vehicle occupant protection device recited in claim 20, wherein said inflatable vehicle occupant protection device when inflated extends from a passenger side A pillar to about a longitudinal centerline of the vehicle.

22. The inflatable vehicle occupant protection device recited in claim 20, wherein said inflatable vehicle occupant protection device when inflated extends from a driver side A pillar to about a longitudinal centerline of the vehicle.

23. The inflatable vehicle occupant protection device recited in claim 20, wherein said inflatable vehicle occupant protection device when inflated extends from a driver side A pillar to a passenger side A pillar.

24. The inflatable vehicle occupant protection device recited in claim 13, wherein said first and second chambers are included in a passenger side portion only of said inflatable vehicle occupant protection device.

25. The inflatable vehicle occupant protection device recited in claim 11, further comprising an inflation fluid source actuatable to provide inflation fluid for inflating said inflatable vehicle occupant protection device.

26. An inflatable windshield curtain comprising:

a first panel of material including first and second side edges, said first panel having a portion folded over onto itself;

a second panel of material including first and second side edges, said second panel having a portion folded over onto itself;

first connections interconnecting overlying folded over portions of said first panel along said first and second side edges of said first panel;

second connections interconnecting overlying folded over portions of said second panel along said first and second side edges of said second panel; and third connections interconnecting overlying portions of said first and second panels separate from said folded over portions of said first and second panels, said third connections extending along overlying first side edges of said first and second panels and along overlying second side edges of said first and second panels;

said first, second, and said third connections along said first side edges of said first and second panels converging at a first location on the windshield curtain;

said first, second, and said third connections along said second side edges of said first and second panels converging at a second location on the windshield curtain, said inflatable vehicle occupant protection device when inflated in a vehicle providing an inflated protection wall extending from adjacent a roof of the vehicle down to adjacent an instrument panel of the vehicle.

* * * * *